(12) United States Patent
Dirschedl et al.

(10) Patent No.: US 6,262,994 B1
(45) Date of Patent: *Jul. 17, 2001

(54) ARRANGEMENT FOR THE OPTIMIZATION OF THE DATA TRANSMISSION VIA A BI-DIRECTIONAL RADIO CHANNEL

(75) Inventors: Werner Dirschedl, Munich; Gerhard Greubel, Rosenheim; Peter Maurer, Feldkirchen, all of (DE)

(73) Assignee: Rohde & Schwarz GmbH & Co. KG, Munich (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/970,140

(22) Filed: Nov. 14, 1997

(30) Foreign Application Priority Data

Dec. 11, 1996 (DE) .............................................. 196 51 593

(51) Int. Cl.[7] ....................................................... H04L 1/00
(52) U.S. Cl. .............................. 370/465; 375/222; 455/69
(58) Field of Search ..................................... 370/252, 465, 370/912, 913, 914, 204; 375/222, 225, 377; 455/68, 69; 714/50, 51, 752

(56) References Cited

U.S. PATENT DOCUMENTS

| | | | |
|---|---|---|---|
| 5,214,687 | * 5/1993 | Kansakoski et al. | 714/51 |
| 5,450,438 | * 9/1995 | Landry et al. | 375/222 |
| 5,524,122 | * 6/1996 | Lepitre et al. | 375/222 |
| 5,550,881 | * 8/1996 | Sridhar et al. | 375/377 |

OTHER PUBLICATIONS

Clover process from CQDL 10/94, "Vergleich von PACTOR und CLOVER für den Kurzwellenfunk", Gerhard Scheuing, DL1GGS, pp. 709–714.

* cited by examiner

Primary Examiner—Wellington Chin
Assistant Examiner—Frank Duong
(74) Attorney, Agent, or Firm—Schiff Hardin & Waite

(57) ABSTRACT

The arrangement is for optimization of data transmission via a bi-directional radio channel in which respective types of modulation can be selected at the transmitter side and the code rate of the forward error correction (FEC) as well as the power of the transmitter Devices (CRC) are provided at the reception side for determination of the error rate. The size of the data packets, and/or the type of modulation, and/or the code rate, and/or the power of the transmitter is varied, dependent on the error rate transmitted back, such that a predetermined error rate is achieved at the reception side.

7 Claims, 1 Drawing Sheet

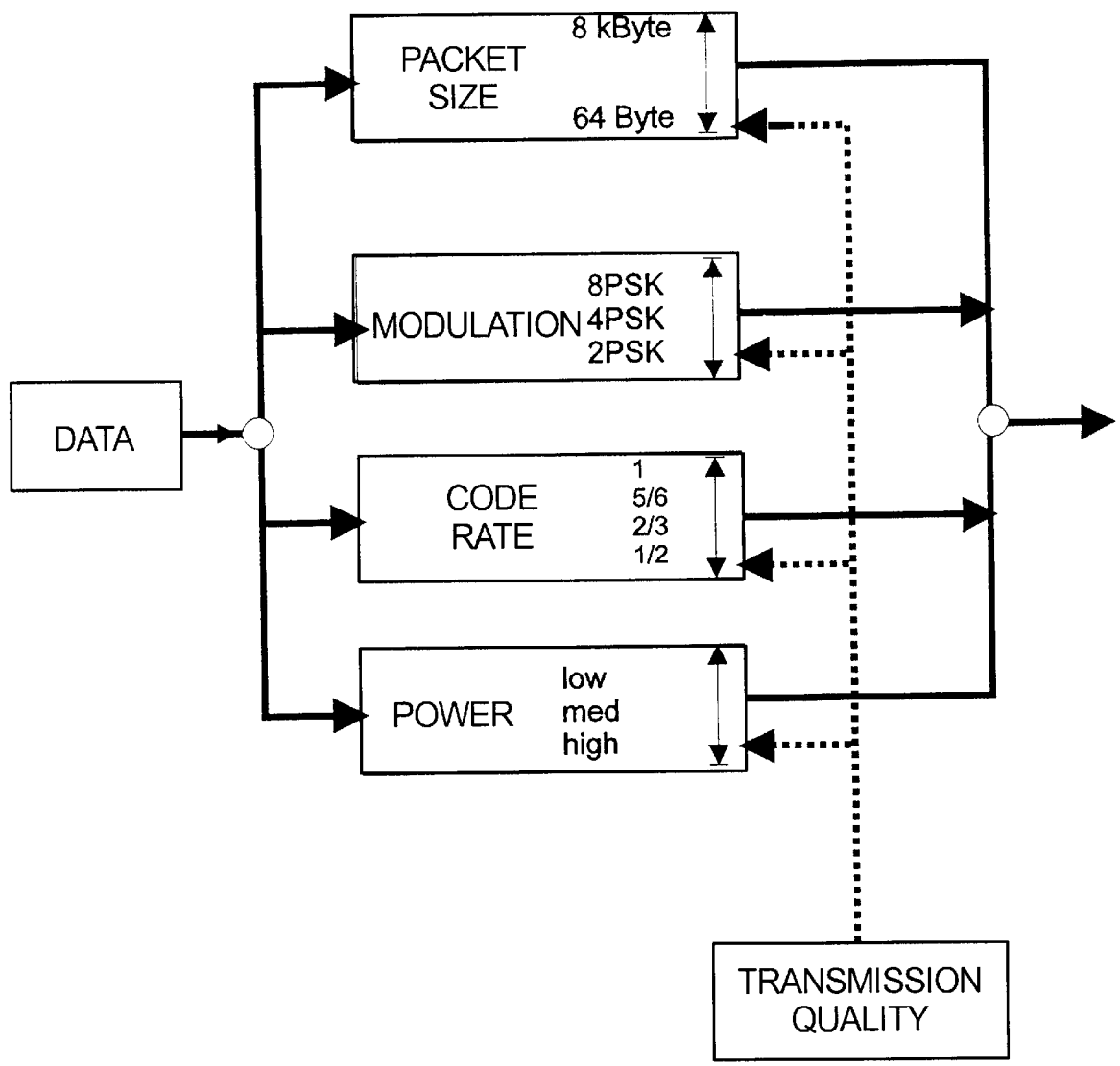

ARRANGEMENT FOR THE OPTIMIZATION OF THE DATA TRANSMISSION VIA A BI-DIRECTIONAL RADIO CHANNEL

BACKGROUND OF THE INVENTION

The present invention is directed to and is based on an arrangement for optimizing data transmission in a radio channel.

A prior art arrangement is known in the area of amateur radio (Clover process from CQDL 10/94, pp. 709–714). Given this Clover process, the number of occurring transmission errors is determined at the reception side using a known redundancy testing process CRC (Cyclic Redundancy Check). This information is transmitted to the remote station and allows the system to adapt to the radio channel by choosing the type of modulation. In addition, phase deviations and SNR (Signal-to-Noise Ratio) in the received signal are measured during existing connection at both stations. The transmitter power can be reduced to the necessary level for an error-free transmission. Standard amateure radio transmitters do not have the possibility of automatic power control of the sender, so that this power reduction has to be done manually during the Clover process.

SUMMARY OF THE INVENTION

It is an object of the present invention to provide an arrangement that is suitable for the more demanding commercial of application of data transmission.

In general terms the present invention is an arrangement for optimizing of data transmission via a bidirectional channel. Modulation types are selectable at a transmitter side of the channel. A code rate of a forward error correction and a power of a transmitter is also settable at the transmitter side. Devices at a reception side of the channel determine an error rate. A device at the transmitter side varies at least one of a size of data packets, type of modulation, code rate, and power of the transmitter as a function of the error rate that is transmitted back from the reception side, such that a predetermined error rate is achieved on the reception side.

Advantageous developments of the present invention are as follows.

When the error rate exceeds a predetermined value, the packet size is reduced and/or a switch is made to a less significant type of modulation and/or to a lower code rate and/or to a higher power automatically, at the transmitter side.

When the error rate is less than a predetermined value, the packet size is increased and/or a switch is made to a more significant type of modulation and/or to a higher code rate and/or to a lower power automatically, at the transmitter side.

In the arrangement of the present invention, the selection is made from four different setting variables at the transmitter side, each of which has influence on the quality of the data transmission. The selection is respectively made in dependence on the same measured variable at the reception side, namely on the error rate determined by the CRC Process. Given the inventive arrangement, only one measured variable has to be transmitted at the reception side back to the remote station. A simple overall structure thereby derives and miscontrols are avoided to the farthest possible extent. The four setting variables are size of the data packets comprising a plurality of frames, various more significant modulation processes, code rate of the forward error correction FEC, and output power of the transmitter.

Deterioration of the data transmission and thus a change in error rate determines which of these setting variables, proceeding from the currently selected setting, can be changed to a variable that improves the data transmission. The sequence of changing the setting variables is dependent on the respective application and it is determined in the control circuit of the transmitter side. The respective change of the setting variables ensues at the transmitter side completely automatically solely in dependence on the retransmitted error rate.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, in which:

The single FIGURE depicts an exemplary embodiment in a schematic circuit diagram.

DESCRIPTION OF THE PREFERRED EMBODIMENTS

The single FIG. shows the data editing of the transmitter side in a bidirectional radio channel wherein the data to be digitally transmitted is divided into individual packets in a known way, successively supplied to the transmitter and transmitted via the radio channel to the remote station. The packets are comprised of a variable plurality of frames, the plurality of frames per packet is dependent on the quality of the radio connection and ranges, for example, between 1 and 15. Each frame is in turn composed, for example, of a 5 Byte long header with check and control information, a following, for example, connecting 4 to 250 Byte long data part, and, for example, a 2 Byte long redundancy code (CRC). By selecting the dataset per frame and selecting the plurality of frames in a packet, the size of the packet can be selected arbitrarily between, for example, 64 Byte and 8 kByte on the transmitter side.

In addition, more significant types of modulation can be set at the transmitter side (as for example disclosed in Meinke/Gundlach, Taschenbuch der Hochfrequenztechnik, $5^{th}$ edition, chapters 015 to 029), for example 2PSK, 4PSK, or 8PSK (PSK refers to Phase Shift Keying). The nature of the various types of modulation that can be selected is dependent on the respective application. It is only necessary that different types of modulation are available which make increasing data rates possible.

In addition, the code rate of the FEC on the transmitter side can be selected, for example, between the most negative value of ½ in increments of 2/3, 5/6 up to the optimal code rate of 1.

Finally, the power of the high frequency transmitter can be automatically set between a lowest value of, for example, 10 Watts over an average up to the highest power of, for example, 100 Watts.

A checksum value is determined using the CRC in a known way in the receiver of the remote station(not shown) of the duplex transmission data circuit that is a measure for the plurality of occurring transmission errors. Thus, it is determined on the reception side whether the error rate of the transmission circuit exceeds or falls short of a predetermined value. This information about the transmission quality is transmitted to the transmitter of the remote station and serves there for determining the respectively most suitable size of packet, type of modulation, code rate of the FEC and power, respectively, in order to improve the transmission quality through the corresponding change of one or more of these setting variables in case of a deterioration of the transmission quality of the radio channel or, conversely, given a very good transmission quality, i.e., at a minimal error rate, to change one or more of these setting variables so that user data can be transmitted at a higher data rate.

Given the setup of the connection, averages of the setting variables, which can be selected, are first set, for example, to a medium size of packet, the type of modulation 8PSK, a FEC code rate of ½, and the highest transmitter power.

If it is thereby determined that the error rate exceeds a preset value, the packet size is automatically reduced and/or the type of modulation is lowered to 4PSK or even 2PSK. In this example, the data rate cannot be improved via the code rate and the power of the data since these setting variables are already at their optimal values. If it is determined, however, that the quality of the transmission circuit is improving, the more significant type of modulation 8PSK is automatically increased from the lowered type of modulation of 4PSK, simultaneously the size of the packet is increased, and the FEC code rate also can be regulated down from its highest value to an average or even to the lowest value. All this ensues automatically.

With an arrangement of the present invention, the data rate, can be automatically optimally adapted to the respective quality of the radio channel, for example between 900 bit/s and 5400 bit/s, by the appropriate selection of the four setting variables.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An arrangement for optimizing data transmission in data packets via a bi-directional channel, comprising:

a modulation selection unit for selecting modulation types at a transmitter side of the channel;

a code rate setting unit for setting a code rate of a forward error correction;

a power setting unit for setting a power of a transmitter at the transmitter side;

a packet size setting unit for setting a size of data packets at the transmitter side of the channel;

an error rate device at a reception side of the channel for determining an error rate in the data transmission; and a device at the transmitter side for varying at least a size of the data packets with the packet size setting unit and the type of modulation with the modulation selection unit both as a function of said error rate transmitted back from the reception side so that a predetermined error rate is achieved at the reception side.

2. The arrangement according to claim 1 wherein when the error rate exceeds a predetermined value, the packet size setting unit reduces the packet size and a switch is made to a less significant type of modulation automatically at the transmitter side with the modulation selection unit.

3. The arrangement according to claim 1 wherein when the error rate is less than a predetermined value, increasing the packet size with the packet size setting unit and switching to a more significant type of modulation automatically at the transmitter side with the modulation selection unit.

4. A method for optimizing data transmission via a bi-directional channel wherein data is transmitted in data packets, comprising the steps of:

providing a first setting variable for setting a size of the data packets at a transmitter side of the bidirectional channel;

providing a second setting variable for setting a modulation process at the transmitter side of the bidirectional channel;

transmitting data in the channel from a transmission side to a reception side using said data packets;

determining an error rate at the reception side and transmitting the error rate back to the transmitter side; and determining as a function of the error rate the first and second variables in order to improve transmission quality.

5. The method according to claim 4 wherein when the error rate exceeds a predetermined value, the first and second variables are changed such that the size of the packets is reduced and a change is made to a less significant type of modulation.

6. The method according to claim 4 wherein when the error rate is less than a predetermined value, the packet size is increased and a change is made to a more significant type of modulation.

7. A method for optimizing data transmission via a bidirectional channel wherein data is transmitted in data packets, comprising the steps of:

providing a first setting variable for setting a size of the data packets at a transmitter side of the bidirectional channel;

providing a second setting variable for setting a modulation process at the transmitter side of the bidirectional channel;

transmitting data in the channel from a transmission side to a reception side using the data packets;

determining an error rate at the reception side and transmitting the error rate back to the transmitter side;

determining as a function of the error rate, the setting for the first and second variables in order to improve transmission quality;

when the error rate exceeds a predetermined value, changing the first and second variables such that the size of the packets is reduced and a change is made to a less significant type of modulation; and pointed out with respect to claim 1 but also by reciting that when an error rate exceeds a predetermined value changing the first and second variable such that the size of the packets is reduced and the change is made to a less significant type of modulation.

\* \* \* \* \*